United States Patent [19]
Ohki

[11] Patent Number: 5,210,559
[45] Date of Patent: May 11, 1993

[54] CAMERA SHAKE CORRECTING DEVICE
[75] Inventor: Mitsuharu Ohki, Tokyo, Japan
[73] Assignee: Sony Corporation, Tokyo, Japan
[21] Appl. No.: 852,714
[22] Filed: Mar. 17, 1992
[30] Foreign Application Priority Data
Mar. 19, 1991 [JP] Japan .................................. 3-055013
[51] Int. Cl.⁵ ........................... G03B 7/08; H04N 7/18
[52] U.S. Cl. ..................................... 354/202; 354/430; 358/222
[58] Field of Search ......................... 354/430, 70, 202; 358/222

[56] References Cited
U.S. PATENT DOCUMENTS

| 4,673,276 | 6/1987 | Yoshida et al. | 354/430 |
| 4,709,138 | 11/1987 | Suda et al. | 354/430 X |
| 5,012,270 | 4/1991 | Sekine et al. | 354/430 |
| 5,099,323 | 3/1992 | Morimura et al. | 358/222 X |
| 5,138,445 | 8/1992 | Ueda | 354/430 X |

Primary Examiner—Michael L. Gellner
Assistant Examiner—Jae N. Noh
Attorney, Agent, or Firm—Lewis H. Eslinger; Jay H. Maioli

[57] ABSTRACT

During a signal inputting period while a dynamic image signal of a present field is input, a movement vector detecting circuit 20 calculates a first movement vector V1 of a present field image with respect to a previous field image with a first accuracy. During a vertical blanking period after the signal inputting period, a second movement vector detecting circuit 30 calculates a second movement V2 according to the first movement vector V1 with a second accuracy higher than the first accuracy. A vector adder 34 composes the movement vectors V1 and V2 to obtain a final movement vector Vf. A second control circuit 71 outputs a reading address corresponding to the final movement vector Vf to a field memory 41, and the field memory 41 outputs an image signal corrected in camera shake. Accordingly, a camera shake correction accuracy is greatly improved without almost increasing a scale of a camera shake correcting circuit constructed as a one-chip circuit.

8 Claims, 9 Drawing Sheets

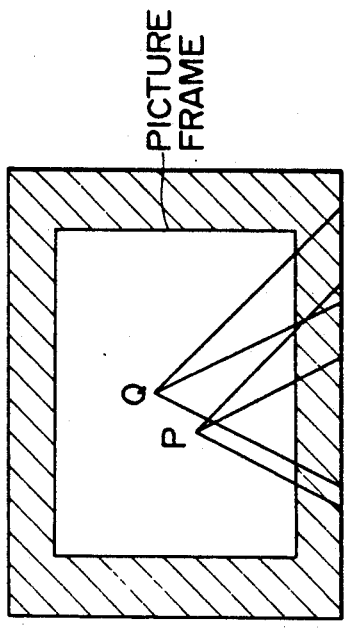
F I G. 7(C)
FIRST FIELD + SECOND FIELD
(CAMERA SHAKE IS NOT CORRECTED)
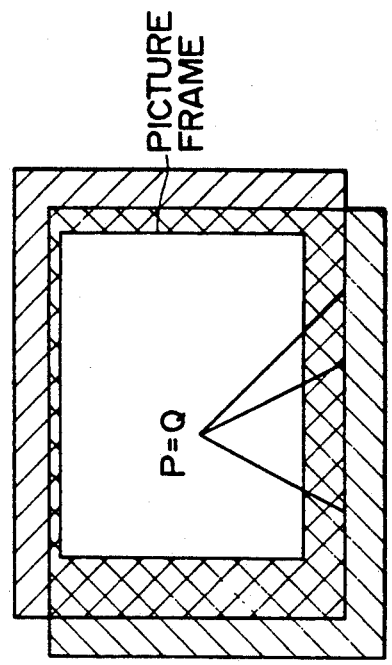
F I G. 7(D)
FIRST FIELD + SECOND FIELD
(CAMERA SHAKE IS CORRECTED)
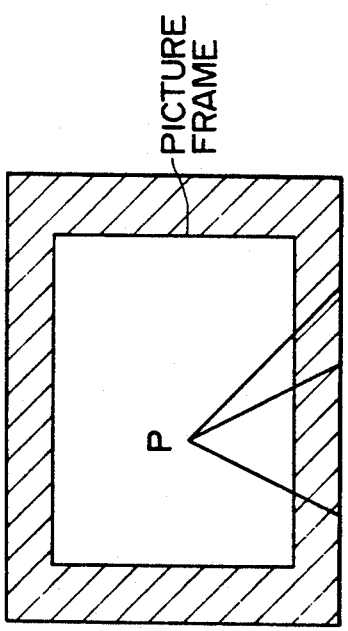
F I G. 7(A)
FIRST FIELD
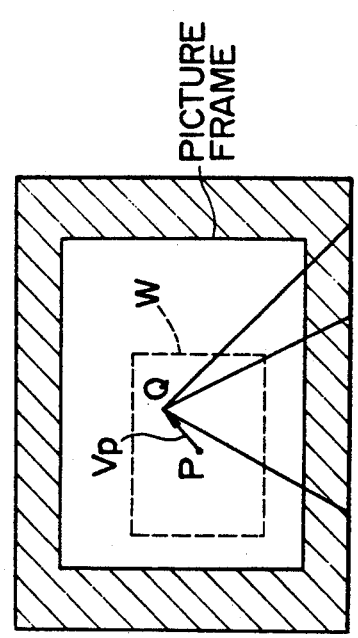
F I G. 7(B)
SECOND FIELD

CAMERA SHAKE CORRECTING DEVICE

BACKGROUND OF THE INVENTION

The present invention relates to a camera shake correcting device for correcting picture movement due to shaking of a video camera or the like by image processing.

Some of recent compact and light video cameras are equipped with a camera shake correcting device. As a countermeasure to the camera shake, there exist a camera shake preventing device for suppressing the occurrence of the camera shake by adopting a gyro or a high-speed shutter and a camera shake correcting device for correcting the camera shake having occurred by image processing.

FIGS. 7A to 7D illustrate a principle of camera shake correction. FIG. 7A shows a picture in an arbitrary field of a dynamic image signal series, the field being assumed as a first field. Reference character P denotes a point set at an arbitrary position in this picture. A picture element data at the point P will be represented by A(P).

FIG. 7B shows a picture in the next field, that is, in a second field. A point Q at which a picture element data is represented by B(Q) should be located at the point P, but the point Q is displaced to a position shown by a movement vector Vp because of camera shake.

FIG. 7C shows a picture obtained by overlapping the first field and the second field without correcting the camera shake. In this case, the picture becomes an inferior video image wherein both the point P and Q which should accord with each other are separated because of camera shake.

To cope with this problem, referring to FIG. 7B, a search area W including the point P as an origin is set, and a position occupied by the picture element data B showing a maximum correlation to the picture element data A at the point P in the search area W is searched. That is, the point Q is searched in the search area W. The search point Q showing the maximum correlation to the point P is assumed as a picture element corresponding point with respect to the point P, and the movement vector Vp is obtained from a distance and a direction from the point P (the origin) to the point Q.

FIG. 7D shows a picture wherein a video image position of the second field with respect to the first field is corrected by the movement vector Vp obtained above. By this correction, a good video image is obtained wherein the point P in the first field and the point Q in the second field accord with each other.

A representative point method is known as an example of detecting methods for the movement vector necessary for the camera shake correction.

FIG. 8 illustrates a conventional representative point method as the movement vector detecting method.

Referring to FIG. 8, Aij denotes a picture element data constituting the first field, and P0, P1, P2 and P3 denote representative points Pk provided in the first field. Picture element data at the representative points Pk are denoted by Ak. In this case, four points (k=0, 1, 2, 3) are selected as the representative points Pk for the convenience of illustration. Bij denotes a picture element data constituting the second field, and W0, W1, W2 and W3 denote search areas where Pk corresponding points in the second field are to be searched with respect to the representative points Pk as origins in the first field. Each search area Wk is so set as to include the corresponding representative point Pk as a search origin and occupy a horizontal range L and a vertical range M.

In case of obtaining the movement vector with the accuracy of $\pm a$ in the horizontal direction (H) and $\pm b$ in the vertical direction (V), search points Qk(l, m) are set in the search area Wk at the intervals of 2a(H) and 2b(V) as shown. That is, the accuracy of the movement vector depends on a density of the search points Qk(l, m) in the search area Wk. In the case that an input signal is a digital image data and the coordinates l and m of the search points Qk(l, m) are decimal, that is, each search point is located between picture elements, picture element data Bk(l, m) at the search points Qk(l, m) may be obtained from the adjacent picture element data by a known interpolation method. Accordingly, a distinction between analog image data and digital image data will not be particularly mentioned in the following description.

The movement vector of the second field with respect to the first field in the above case is obtained in the following manner. Absolute values of differences between the picture element data Bk(l, m) at the search points Qk(l, m) in the search area Wk and the picture element data Ak at the representative points Pk are summed up for k to obtain residuals S(l, m) as follows:

$$S(l, m) = |B0(l, m) - A0| + |B1(l, m) - A1| + |B2(l, m) - A2| + |B3(l, m) - A3|.$$

As the total number of the search points Qk(l, m) in the search area Wk corresponding to the representative points Pk is L/(2a)×M/(2b), the total number of the residuals S(l, m) to be obtained is also L/(2a)×M/(2b). For example, the residuals S(l, m) are as follows:
S(0, 0), S(2a, 0), S(−2a, 0), S(0, 2b), S(0, −2b), ..., S(2a, 2b), S(−2a, 2b), ...

The minimum one S(l0, m0) of the L/(2a)×M/(2b) residuals S(l, m) is obtained, and the picture element corresponding point in the second field with respect to the representative point Pk in the first field is set to Qk(l0, m0). In this way, the movement vector Vp is obtained from a distance and a direction from the search origin Pk to the corresponding point Qk(l0, m0).

In displaying the second field in succession to the first field, a display position of the second field is modified so that the representative point Pk in the first field and picture element corresponding point Qk(l0, m0) in the second field may be displayed at the same position on the picture plane according to the movement vector Vp, thereby correcting the picture movement due to the camera shake.

FIG. 9 is a block diagram of a conventional camera shake correcting device based on the above principle of correction of the camera shake.

Referring to FIG. 9, it is assumed that the picture element data Ak at the representative points Pk (k=0, 1, 2, 3) are stored in a representative point memory 11 during an inputting period of picture signals of the first field. Of the picture signals of the second field to be input, the picture element data Bk at the representative points Qk are stored through a switch SW1 into a representative point memory 12, and they become the picture element data Bk at the representative points Qk in a picture signal processing for the next or third field. At the same time, the picture signals of the second field to be input are supplied to an input terminal 211 of a residual calculating circuit 21 and a field memory 41.

The residual calculating circuit 21 calculates the residuals S(l, m) of the total number of L/(2a)×M/(2b) from the picture element data Ak supplied from the representative point memory 11 through a switch SW2 to an input terminal 210 and the picture element data Bk(l, m) at the search points Qk(l, m) in the search areas Wk of the picture element data Bij of the second field supplied to the input terminal 211, and stores an intermediate result or a final result of the residuals S(l, m) in a residual memory 22.

The minimum one S(l0, m0) of the L/(2a)×M/(2b) residuals S(l, m) as the final result stored in the residual memory 22 is detected by a movement vector calculating circuit 23, which calculates the movement vector Vp from a distance and a direction from the representative point Pk as the search origin to the position Qk(l0, m0) of the minimum residual S(l0, m0). Then, the movement vector Vp thus obtained is output to a control circuit 51.

In reading the picture signals of the second field stored in the field memory 41, the control circuit 51 adds a cumulated value of all the past movement rectors to the movement vector Vp supplied from the movement vector calculating circuit 23. According to the result of the addition, the control circuit 51 applies to the field memory 41 a reading address RA for correcting the picture movement due to the camera shake of the second field with respect to the first field. In this way, the picture signals of the second field obtained by correcting the picture movement due to the camera shake with respect to the picture of the first field according to the movement vector Vp are output from the field memory 41.

In the conventional construction mentioned above, the switch SW1 is operated in such a manner that the picture element data at the representative points in the odd fields are stored into the representative point memory 11 and the picture element data at the representative points in the even fields are stored into the representative memory 12. The switch SW2 is operated reversely to the above of the switch SW1, and supplies the picture element data at the representative points in the just previous field. Such a two-bank system that the representative point memory is constituted of the two representative point memories 11 and 12 is an ordinary means for effecting real-time image processing.

In the conventional construction mentioned above, the residual calculating circuit 21, the residual memory 22 and the movement vector calculating circuit 23 constitute a movement vector detecting circuit 20.

In most cases, the representative memories 11 and 12, the movement vector detecting circuit 20, the control circuit 51 and the switches SW1 and SW2 are constructed as a one-chip camera shake correcting circuit.

In the conventional camera shake correcting device as mentioned above, it is demanded to improve a correction accuracy. That is, it is demanded to improve an accuracy of the movement vector. However, in case of improving the accuracy of the movement vector three times, for example, the total number of the residuals S(l, m) to be calculated is increased nine times (=three times (H)×three times (V)) as apparent from the above description. Accordingly, the residual memory 22 is required to have a memory capacity increased nine times. As a result, it is difficult to construct the camera shake correcting circuit as a one-chip circuit, causing an obstacle to provision of a compact and light video camera having a high function at a low cost.

SUMMARY OF THE INVENTION

It is accordingly an object of the present invention to provide a camera shake correcting device which can greatly improve a camera shake correction accuracy without almost increasing a scale of a camera shake correcting circuit by calculating a first movement vector with a first accuracy during a signal inputting period while an image signal of a certain field is input and by calculating a second movement vector with a second accuracy higher than the first accuracy during a vertical blanking period after the signal inputting period, thereby obtaining a final movement vector with a high accuracy.

According to the present invention, there is provided a camera shake correcting device comprising a memory for storing a representative image data representing an arbitrary n-th field, where n represents a positive integer; a first movement vector detecting circuit for searching a corresponding image data corresponding to the representative image data with a first search point density in an (n+i)-th field, where i represents a positive integer, during a signal inputting period while a dynamic image data of the (n+i)-th field and for outputting a displacement of the corresponding image data with respect to the representative image data as a first movement vector; a field memory for storing the dynamic image data of the (n+i)-th field during the signal inputting period; and a second movement vector detecting circuit for searching the corresponding image data with a second search point density higher than the first search point density in the vicinity of an end of the first movement vector during a vertical blanking period just after the signal inputting period and for outputting a displacement of the corresponding image data with respect to the representative image data as a final movement vector; wherein the dynamic image data of the (n+i)-th field stored in the field memory is ready by using a reading address shifted according to the final movement vector.

In a preferred mode of the present invention, the first and second movement vector detecting circuits are replaced by a single movement vector detecting circuit adapted to be controlled in a time sharing fashion such that the first movement vector is output during the signal inputting period and the final movement vector is output during the vertical blanking period.

In another preferred mode of the present invention, a plurality of the first movement vector to be output during the signal inputting period are provided.

In a further preferred mode of the present invention, the above correcting device further comprises a low pass filter for preliminarily smoothing both the representative image data and the corresponding image data for outputting the first movement vector.

In the camera shake correcting device according to the present invention, an input signal shown in FIG. 1 is a dynamic image signal in an arbitrary (n+i)-th field, where n and i represent positive integers. The dynamic image signal is supplied to a residual calculating circuit 21 in a movement vector detecting circuit 20, and it is also written into a field memory 41.

In a signal inputting period of the (n+i)-th field, the residual calculating circuit 21 calculates residuals at search points set with a first search point density from a picture element data at a representative point in the n-th field input from a representative point memory 11 or 12 depending upon an odd or even field through a switch SW2 and a picture element data in the (n+i)-th field directly input. Then, an intermediate result or a final result of this residual calculation is stored into a residual memory 22.

A movement vector calculating circuit 23 calculates a first movement vector V1 from a search point indicating a minimum one of the residuals, and outputs the first movement vector V1 to a first control circuit 61 and a vector adder 34. The first control circuit 61 supplies a first reading address RA1 shifted according to the first movement vector V1 through a switch SW3 to the field memory 41.

During a vertical blanking period just after the signal inputting period of the (n+i)-th field, the field memory 41 supplies the image data in the (n+i)-th field through a switch SW4 to a second movement vector detecting circuit 30 by the first reading address RA1. On the other hand, the second movement vector detecting circuit 30 is supplied with the image data at the representative point in the n-th field through the switch SW2.

Like the movement vector detecting circuit 20, the second movement vector detecting circuit 30 calculates second residuals at search points set with a second search point density higher than the first search point density in the vicinity of an end of the first movement vector V1, and calculates a second movement vector V2 from a search point indicating a minimum one of the second residuals. Then, the second movement vector V2 is output to the vector adder 34.

The vector adder 34 composes the first and second movement vectors V1 and V2 to obtain a final movement vector Vf, and outputs the final movement vector Vf to a second control circuit 71. The second control circuit 71 cumulates all the past final movement vectors to the (n+i)-th field, and supplies a final reading address RAf shifted according to a result of this cumulation through the switch SW3 to the field memory 41.

During a signal inputting period of an (n+i+1)-th field, the field memory 41 outputs the corrected dynamic image data in the (n+i)-th field through the switch SW4 by the final reading address RAf.

Thus, the camera shake correcting device according to the present invention can realize a final movement vector with a higher accuracy as compared with the prior art without almost increasing a scale of a camera shake correcting circuit.

Other objects and features of the invention will be more fully understood from the following detailed description and appended claims when taken with the accompanying drawings.

BRIEF DESCRIPTION OF THE DRAWINGS

FIGS. 7A-7D are views illustrating a principle of camera shake correction;

DETAILED DESCRIPTION OF THE PREFERRED EMBODIMENTS

There will now be described some preferred embodiments of the camera shake correcting device according to the present invention with reference to the drawings.

Figure 1:
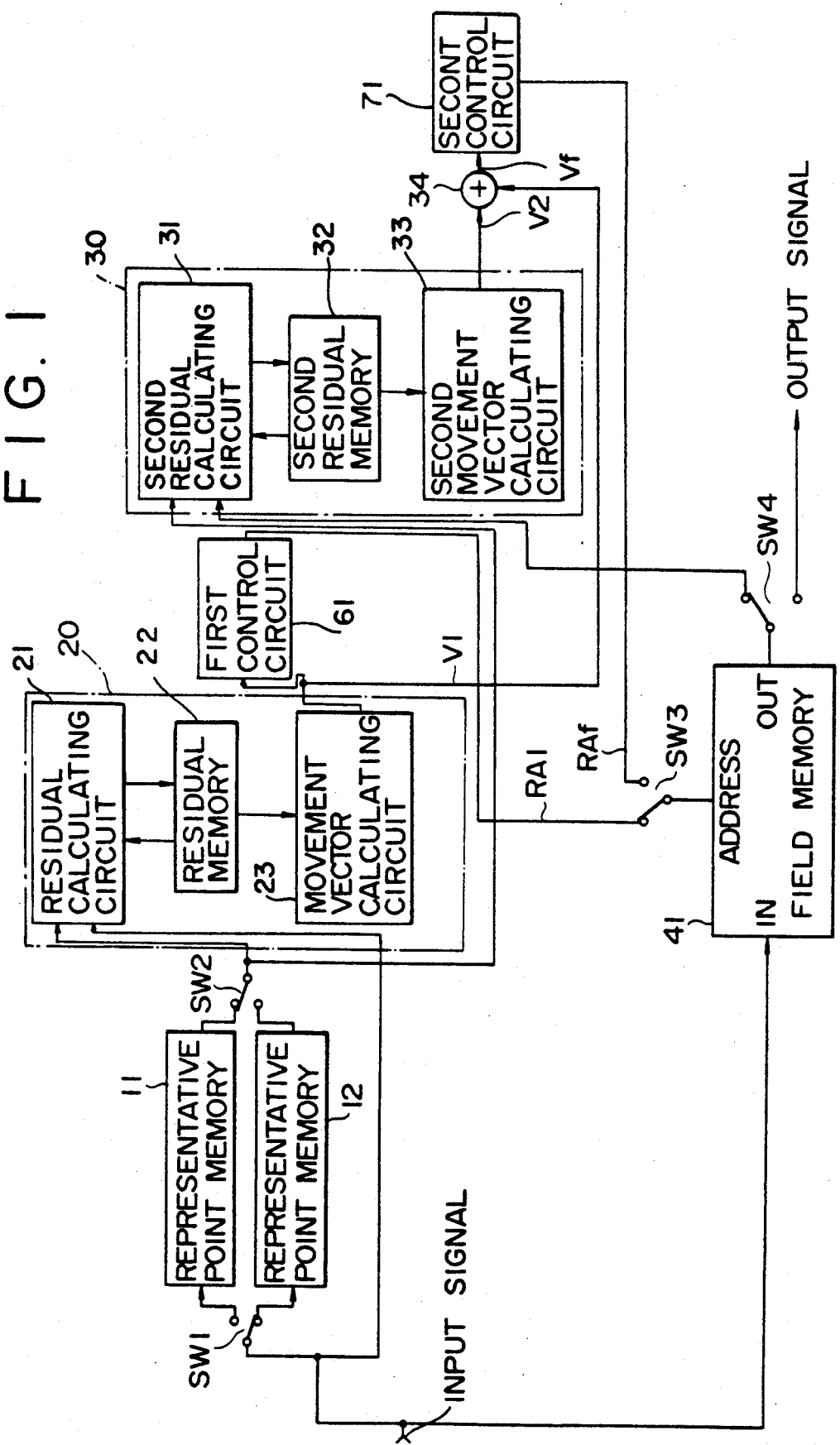
FIG. 1 is a block diagram of a first preferred embodiment of the present invention.
Figure 9:
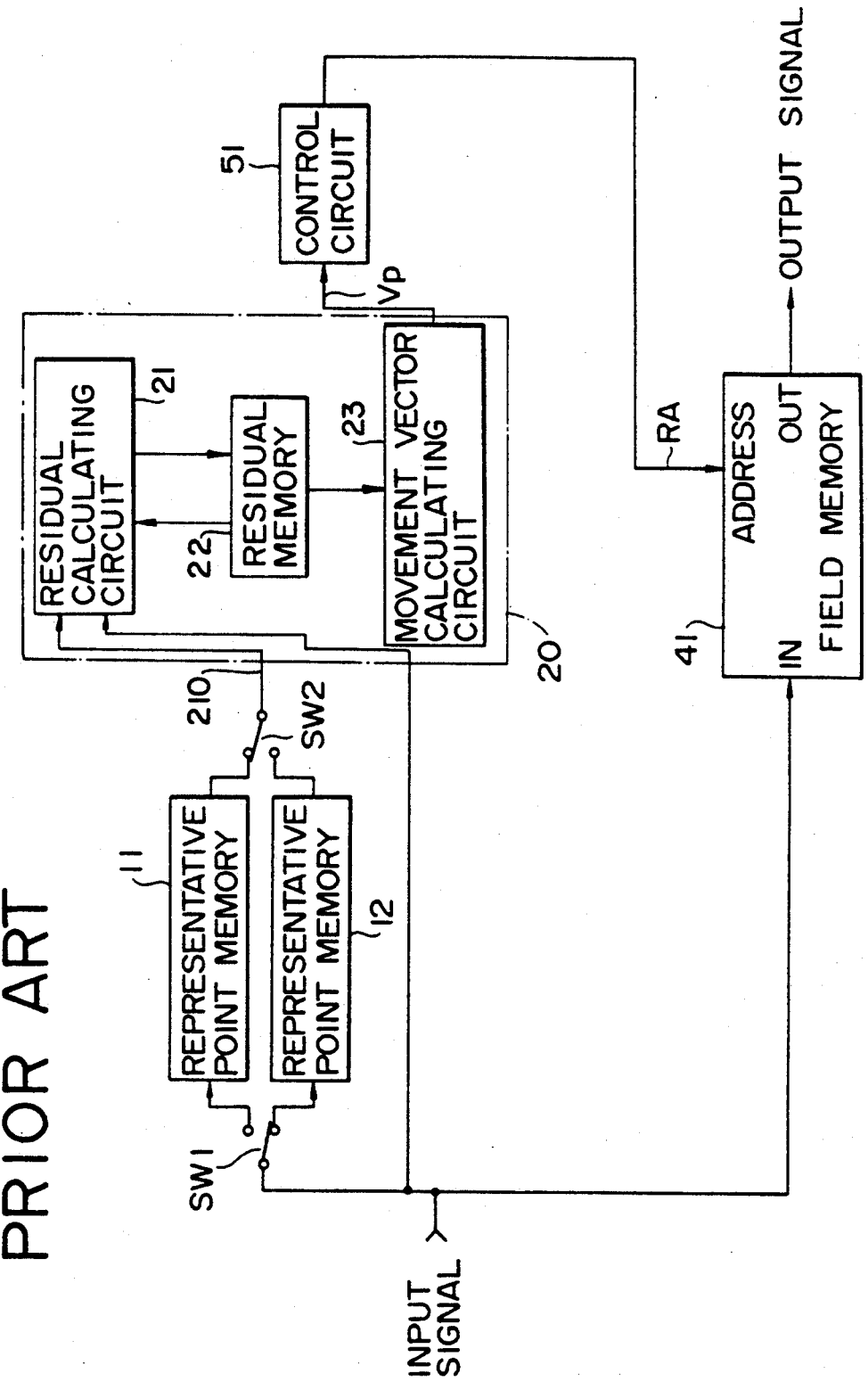
FIG. 9 is a block diagram of a camera shake correcting device in the prior art.

FIG. 1 is a block diagram of a first preferred embodiment of the present invention, wherein the same parts as those shown in FIG. 9 are denoted by the same reference numerals, and the explanation thereof will be omitted hereinafter. Further, in the case that an input signal is a digital image data and the coordinates l and m of the search points are decimal, that is, each search point is located between picture elements, picture element data at the search points may be obtained from the adjacent picture element data by a known interpolation method as mentioned previously. Accordingly, a distinction between analog signal and digital signal will now be referred in the following description.

Referring to FIG. 1, the correcting device includes a representative point memory 11 for odd fields, a representative point memory 12 for even fields, a movement vector detecting circuit 20, a residual calculating circuit 21, a residual memory 22, a movement vector calculating circuit 23, a field memory 41 and switches SW1 and SW2. These elements are identical with those shown in FIG. 9.

Reference numeral 30 denotes a second movement vector detecting circuit having the same construction as that of the movement vector detecting circuit 20. That is, the second movement vector detecting circuit 30 is constituted of a second residual calculating circuit 31, a second residual memory 32, and a second movement vector calculating circuit 33. The second movement vector detecting circuit 30 is a circuit for calculating a second movement vector V2 during a vertical blanking period, so as to obtain a final movement vector Vf having a higher accuracy according to a first movement vector V1 to be output from the first movement vector detecting circuit 20.

A vector adder 34 is provided to add the first movement vector V1 and the second movement vector V2. A first control circuit 61 is provided to output to the field memory 41 a first reading address RA1 shifted according to the first movement vector V1. A second control circuit 71 is provided to add the final movement vector Vf from the vector adder 34 to a cumulated value of all the final movement vectors in the past fields and output to the field memory 41 a final reading address RAF shifted according to a result of this addition.

Switches SW3 and SW4 are operated to have the positions shown during the vertical blanking period, while being operated to have the reverse positions during the dynamic image signal inputting period.

Figure 2:
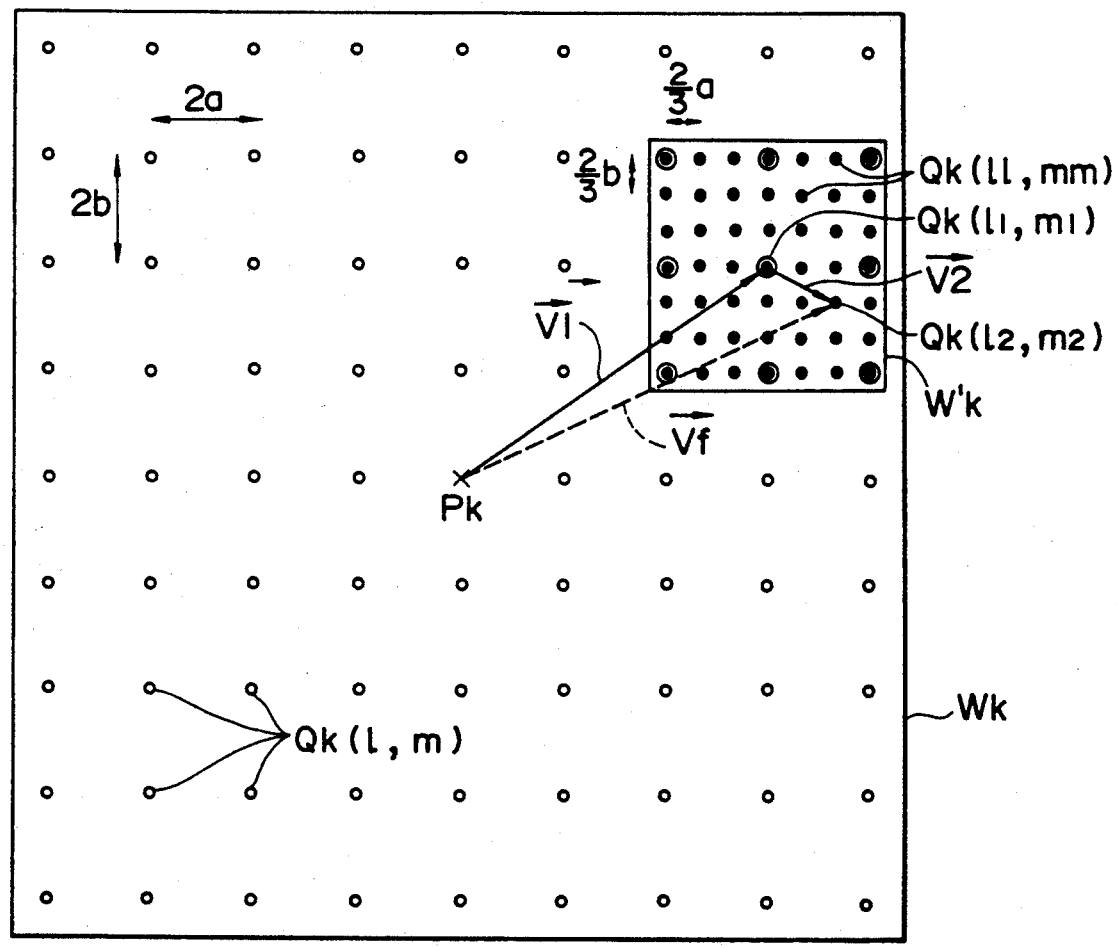
FIG. 2 is a view illustrating detection of a movement vector in the first preferred embodiment.

FIG. 2 illustrates search areas Wk and W'k for the movement vectors V1 and V2 in the present invention. One or more sets of such search areas are set in each field for a dynamic image signal to be input. In this case, four sets (k=0, 1, 2, 3) are set like the prior art mentioned previously, and the field shown in assumed as a second field.

A horizontal size L and a vertical size M of each search area Wk are predetermined arbitrary magnitudes. A search origin is located at the same position as that of a representative point Pk set in a first field, and search points shown by circles are set at the pitch of 2a (H) and 2b (V) similar to that in the prior art. The accuracy of the first movement vector V1 to be obtained according to the density of the search points thus defined becomes $\pm a$(H) and $\pm b$(V).

An end point Qk(l1, m1) of the first movement vector V1 is defined as a search point in the second search area W'k, and the size of the second search area W'k is set to L'(H)$\times$M'(V). Accordingly, the position of the second search area W'k in the search area Wk depends on the first movement vector V1 obtained.

The size L'(H)$\times$M'(V) of the second search area W'k is suitably set so as to satisfy the conditions of L'$\geq$a and M'$\geq$b according to the accuracy of the first movement vector V1. The pitch of search points Qk(ll, mm) in the second search area W'k is set to a value less than 2a(H) and 2b(V) according to a desired accuracy of the final movement vector. In this case, the pitch is set to 2a/3(H) and 2b/3(V) so that the accuracy of the final movement vector may become three times the accuracy $\pm a$(H) and $\pm b$(V) of the first movement vector V1. Accordingly, the density of the second search points Qk(ll, mm) becomes nine times (three times x three times) the density of the search points Qk(l, m) for obtaining the first movement vector V1, and the accuracy of the final movement vector becomes $\pm a/3$(H) and $\pm b/3$(V).

The first movement vector V1 is obtained from the search points Qk(l1, m1) indicating minimum residuals S(l1, m1). Accordingly, in the case that a plurality of search points providing such minimum residuals S(l1, m1) are obtained, a plurality of sets of the second search areas W'k (in this case, a set of the second search areas is constituted of W'0, W'1, W'2 and W'3) are provided according to the number of the search points. Further, in consideration of temporality of the first movement vector V1, the search point indicating the minimum residual may be assumed as a first proposed search point, and the search point indicating the next minimum residual may be assumed as a second proposed search point. Similarly, the other search points may be assumed, thus adopting a plurality of first movement vectors. Also in this case, a plurality of sets of the second search areas W'k are set.

In the case that a plurality of first movement vectors V1(1), V1(2), and others are adopted, minimum second residuals S(l2, m2, 1), S(l2, m2, 2), and others may be obtained respectively for each of the plural sets of the second search areas W'k(1), W'k(2), and others, and a minimum one of the minimum second residuals may be adopted to obtain a second movement vector V2.

Figure 3:
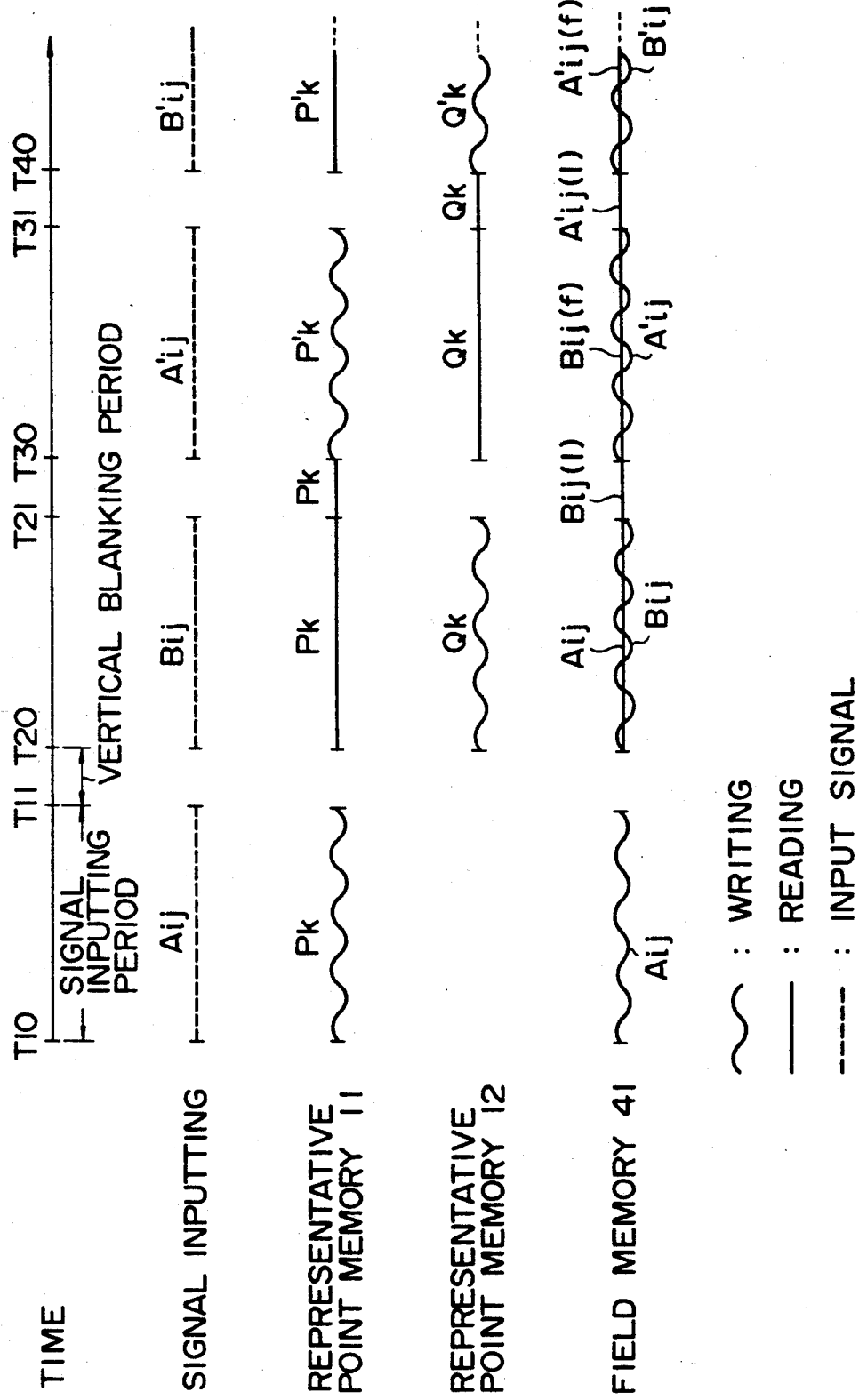
FIG. 3 is a timing chart in the first preferred embodiment.

FIG. 3 is a timing chart of each part in the camera shake correcting device shown in FIG. 1, wherein a dashed line indicates inputting of picture element data; a solid line indicates reading from each memory; and a wave line indicates writing to each memory.

Referring to FIG. 3, dynamic image signals Aij, Bij, A'ij, and others of the first, second, third, and other fields are input during signal inputting periods T10-T11, T20-T21, T30-T31, and others, respectively. Picture element data Ak, A'k, and others at the representative points Pk, P'k, and others in the odd fields are written into the representative point memory 11, and picture element data Bk, B'k, and others at the representative points Qk, Q'k, and others in the even fields are written into the representative point memory 12. The field memory 41 outputs corrected dynamic image signals Aij, Bij(f), A'ij(f), and others delayed by one field, and simultaneously fetches dynamic image signals Aij, Bij, A'ij, B'ij, and others to be currently input. However, the dynamic image signal Aij to be output during the period T20-T21 is not corrected because no preceding field is present, and it is output as it is. Further, as any dynamic image signal delayed by one field to be output during the period T10-T11 is not present, a null data or an invalid data is output.

On the other hand, during vertical blanking periods T21-T30, T31-T40, and others, picture element data Bij(1), A'ij(1), and others in the second, third, and other fields by the first reading address RA1 are read and supplied through the switch SW4 to the second residual calculating circuit 31 in the second movement vector detecting circuit 30, so as to detect the second movement vector V2.

As apparent from the timing chart shown in FIG. 3, during the signal inputting periods T20-T30, T30-T40, and others, same signal processing is repeated for the dynamic image signals Bij, A'ij, B'ij, and others to be input in the second field and subsequent fields, and during the successive signal inputting periods T30-T31, T40-T41, and others, the corrected dynamic image signals Bij(f), A'ij(f), and others are output.

Accordingly, the processing for the dynamic image signal Bij in the second field in the preferred embodiment shown in FIG. 1 will now be described individually in the following three sections, i.e., (1) detection of the first movement vector V1 during the signal inputting period T20-T21, (2) detection of the second movement vector V2 during the vertical blanking period T21-T30, and (3) output of the corrected dynamic image signal B'ij(f) in the second field.

(1) Detection of the first movement vector V1 (signal inputting period T20-T21):

Referring to FIG. 1, the movement vector to be output from the movement vector calculating circuit 23 in the movement vector detecting circuit 20 by the processing similar to that in the prior art is output as the first movement vector V1. The first movement vector V1 is supplied to the first control circuit 61 and the vector adder 34. The first control circuit 61 outputs the first reading address RA1 shifted according to the first movement vector V1 to the field memory 41.

At the same time, the dynamic image signal Bij is written into the field memory 41, and the representative points Qk in the second field are written into the representative point memory 12.

(2) Detection of the second movement vector V2 (vertical blanking period T21-T30):

The switches SW3 and SW4 to be controlled by a vertical synchronizing signal (not shown) are operated to have the positions shown in FIG. 1. Accordingly, the first reading address RA1 output from the first control circuit 61 is supplied through the switch SW3 to the field memory 41. Then, the field memory 41 outputs the image signal Bij(1) in the second field corrected according to the first movement vector V1, that is, the picture element data Bk(ll, mm) at the second search points Qk(ll, mm), through the switch SW4 to the second residual calculating circuit 31. Further, the representative point memory 11 supplies the picture element data Ak at the representative points Pk (k=0, 1, 2, 3) in the first field through the switch SW2 to the second residual calculating circuit 31.

The second residual calculating circuit 31 calculates the second residuals $S(ll, mm) = |B0(ll, mm) - A0| + |B1(ll, mm) - A1| = |B2(ll, mm) - A2| = |B3(ll, mm) - A3|$ for the second search points provided with a second density about the second search origin Qk(l1, m1) in the second search area W'k, and stores the intermediate result or the final result into the second residual memory 32. Since the number of the second search points is small in this case as shown in FIG. 2, the capacity of the second residual memory 32 may be made small. Accordingly, an increase in scale of the circuit to be added to the conventional construction can be made minute.

The second movement vector calculating circuit 33 detects the minimum one (l2, m2) of the second residuals S(ll, mm) stored in the second residual memory 32, and outputs the second movement vector V2 having a start point (l1, m1) and an end point (l2, m2) to the vector adder 34.

The vector adder 34 adds the second movement vector V2 and the first movement vector V1 supplied from the movement vector calculating circuit 23, and outputs the final movement vector Vf to the second control circuit 71.

The second control circuit 71 adds the final movement vector Vf for the second field newly supplied from the vector adder 34 to a cumulated value of all the past final movement vectors, and supplies the final reading address RAf shifted according to the result of this addition through the switch SW3 to the field memory 41. In this case of the second field, the cumulated value of all the past final movement vectors is naturally zero.

(3) Output of the corrected dynamic image signal Bij(f) (signal inputting period T30–T31):

During the signal inputting period T30–T31, the switches SW3 and SW4 are operated to have the positions reverse to those shown in FIG. 1. Accordingly, the field memory 41 inputs the final reading address RAf through the switch SW3 and outputs the image signal Bij(f) of the second field corrected with respect to the image of the first field according to the final reading address RAf.

Subsequently, the above processing of the sections (1), (2) and (3) is repeated in sequence for the dynamic image signal A'ij of the third field and the dynamic image signal B'ij of the fourth field, thus effecting the correction of the camera shake.

Figure 4:
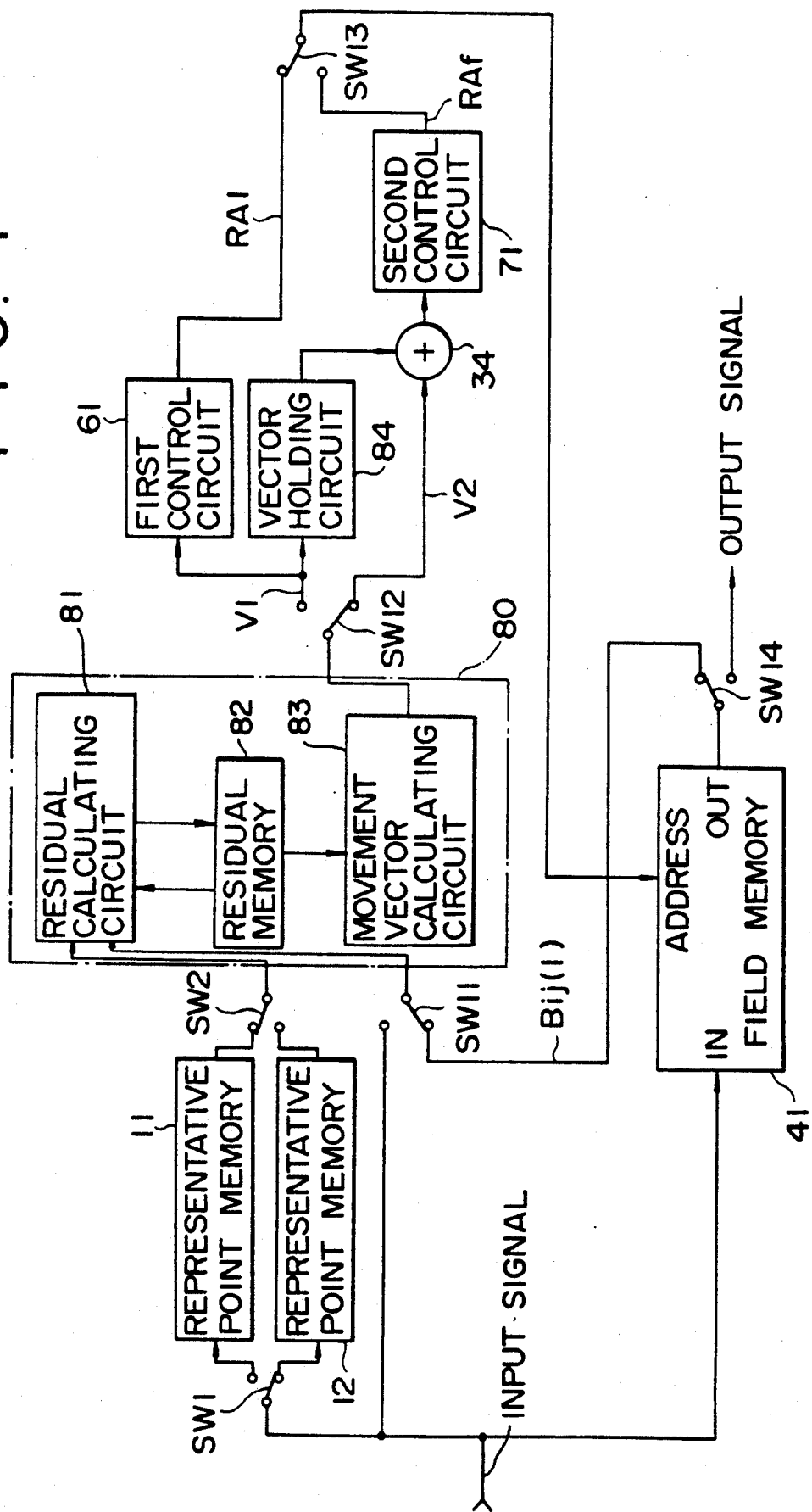
FIG. 4 is a block diagram of a second preferred embodiment of the present invention.

FIG. 4 is a block diagram of a second preferred embodiment of the present invention.

Reference numeral 80 denotes a movement vector detecting circuit so constructed as to carry out both the functions of the movement vector detecting circuit 20 and the second movement vector detecting circuit 30 shown in FIG. 1 in a time sharing fashion. That is, the operation of the movement vector detecting circuit 80 constituted of a residual calculating circuit 81, a residual memory 82 and a movement vector calculating circuit 83 is similar to the operation of the movement vector detecting circuit 20 plus the second movement vector detecting circuit 30. Therefore, the explanation of such similar operation will be omitted hereinafter.

To effect the time sharing control in the second preferred embodiment, switches SW11, SW12 and SW13 are additionally provided. There are shown the switch positions during a vertical blanking period. During a signal inputting period, the switches SW11, SW12 and SW13 are operated to have the positions reverse to those shown in FIG. 4.

Reference numeral 84 denotes a vector holding circuit for holding the first movement vector during the vertical blanking period. The vector holding circuit 84 is additionally provided to carry out the time sharing control.

Figure 5:
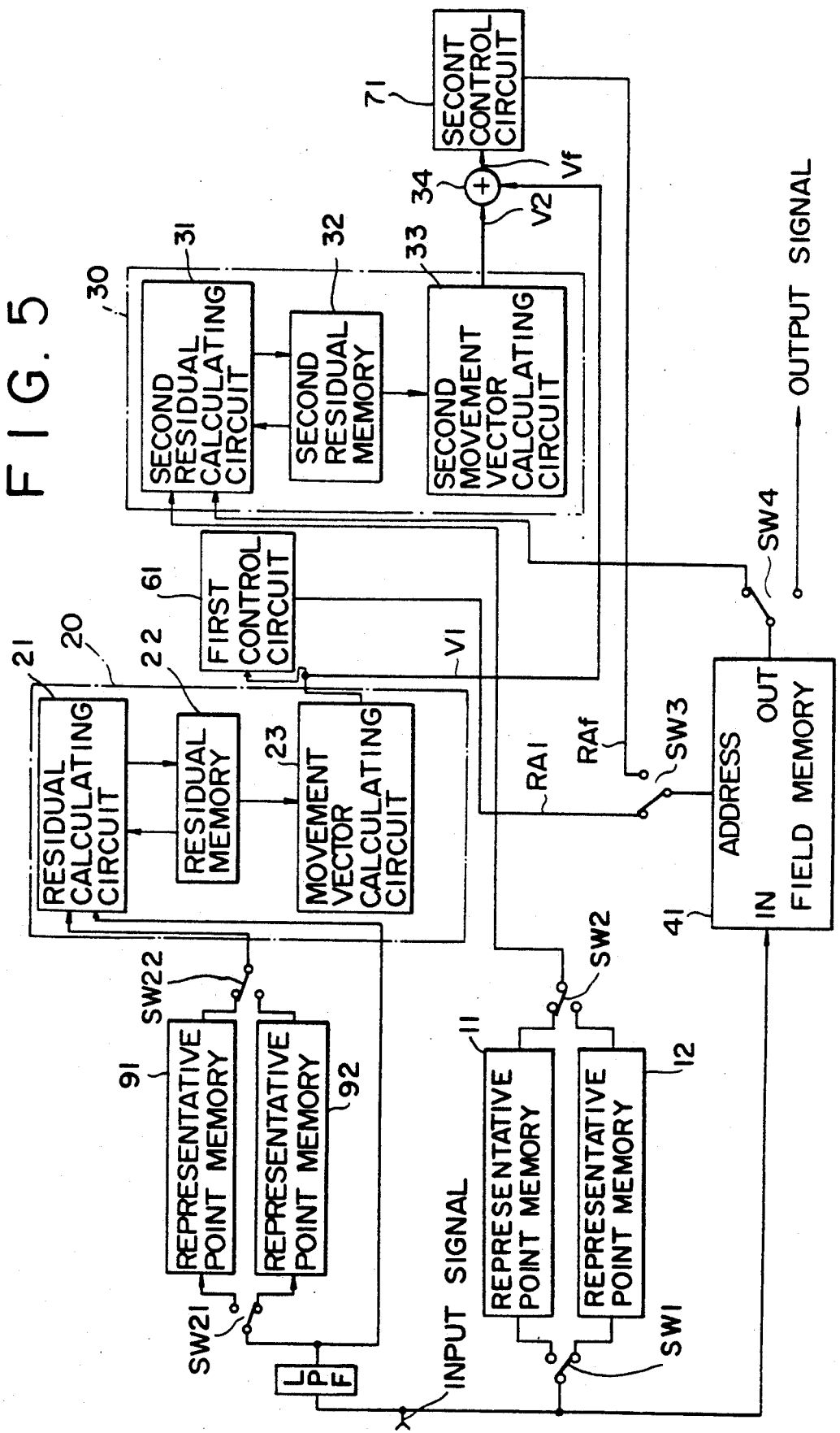
FIG. 5 is a block diagram of a third preferred embodiment of the present invention.

FIG. 5 is a block diagram of a third preferred embodiment of the present invention. In the third preferred embodiment, there are additionally provided a low pass filter (LPF) for carrying out smoothing of a dynamic image signal to be input, a representative point memory 91 for storing data smoothed by the low pass filter 90 as the picture element data at the representative points Pk in the odd fields, and a representative point memory 92 for storing data smoothed by the low pass filter 90 as the picture element data at the representative points Qk in the even fields.

Similarly to the switches SW1 and SW2, additional switches SW21 and SW22 are operated in synchronism with a change in odd and even of the fields. There are shown the switch positions in the even fields.

One of two inputs into the movement vector detecting circuit 20 for detecting the first movement vector V1 is a picture element data at a representative point which data has been smoothed and supplied through the switch SW22, while the other input is a dynamic image signal smoothed and supplied from the low pass filter 90. Accordingly, the residual calculation by the movement vector detecting circuit 20 is residual calculation between averaged data obtained by smoothing a plurality of picture element data according to a desired accuracy of the first movement vector V1, so that the first movement vector V1 to be obtained in this preferred embodiment becomes more accurate.

The other construction and operation except those of the low pass filter 90, the representative point memories 91 and 92, and the switches SW21 and SW22 mentioned above are identical with those of the first preferred embodiment, and the explanation thereof will therefore be omitted.

Figure 6:
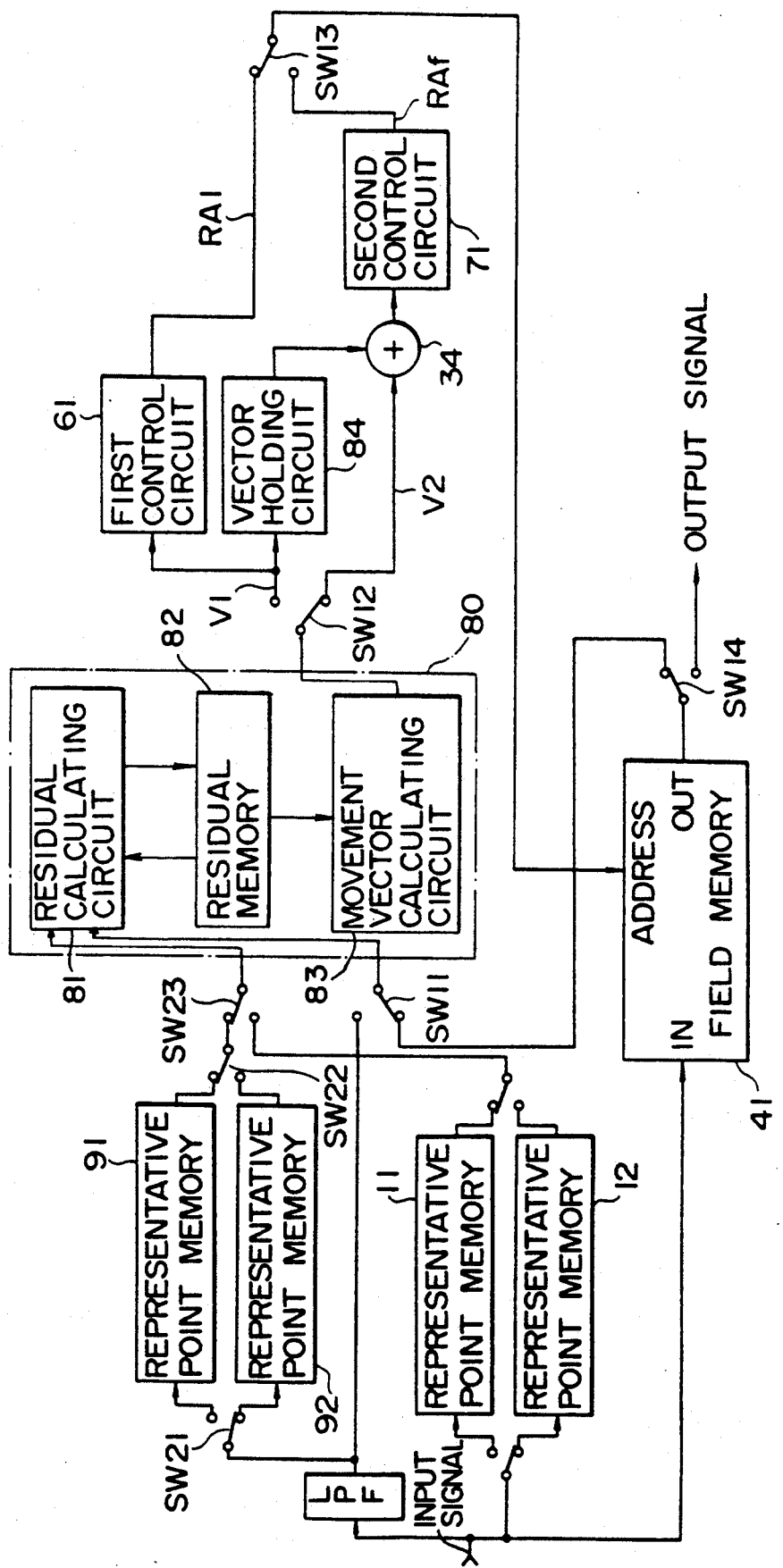
FIG. 6 is a block diagram of a fourth preferred embodiment of the present invention.
Figure 8:
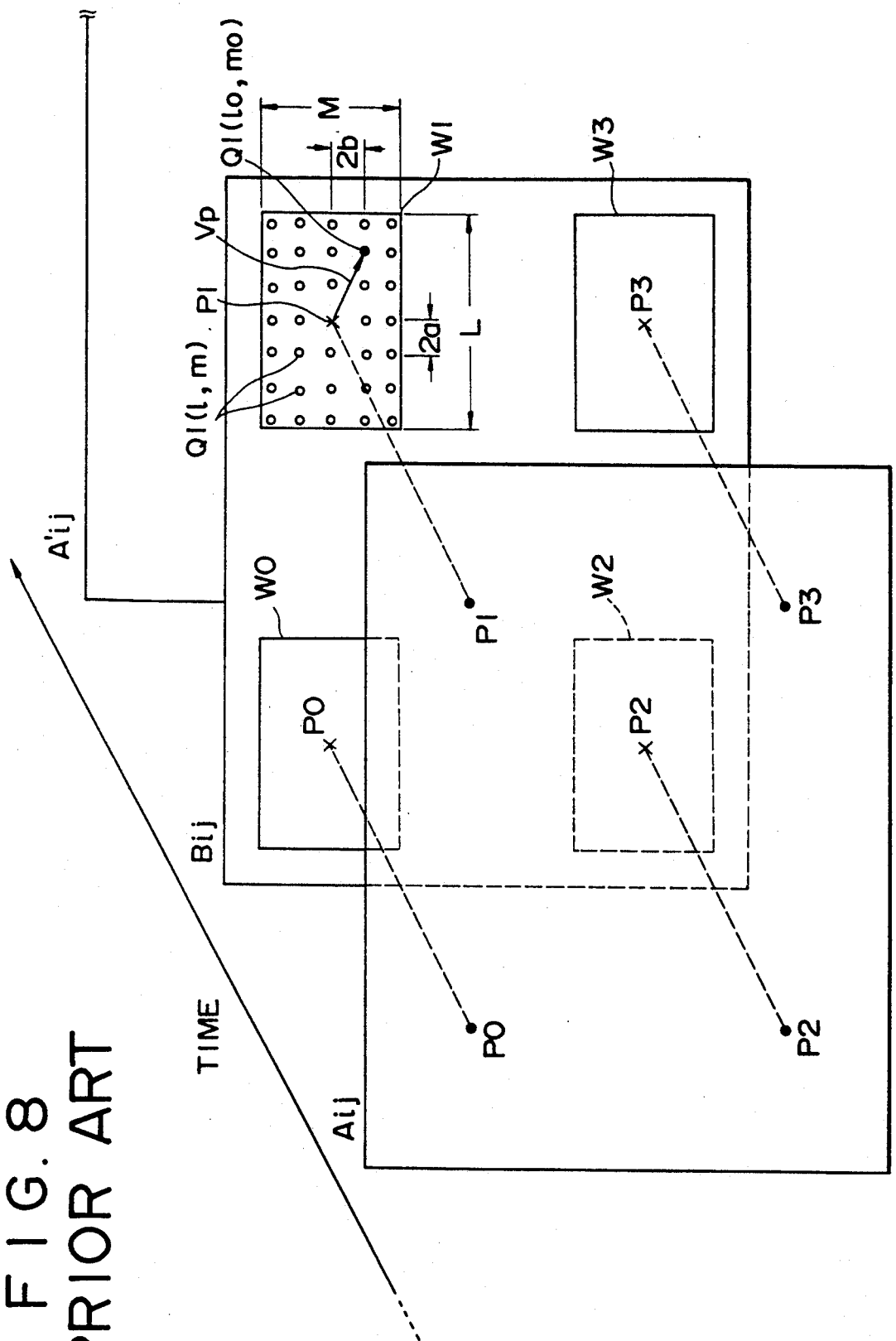
FIG. 8 is a view illustrating detection of a movement vector by a representative point method in the prior art.

FIG. 6 is a block diagram of a fourth preferred embodiment of the present invention. The fourth preferred embodiment is constructed by adding smoothing means similar to that shown in FIG. 5 to the second preferred embodiment shown in FIG. 4.

An additional switch SW23 is operated to have a position reverse to that shown during a signal inputting period and have the position shown during a vertical blanking period.

The construction of the fourth preferred embodiment is the same as that of the second preferred embodiment shown in FIG. 4 except that the low pass filter 90, the representative point memories 91 and 92, and the switches SW21–SW23 are added. Further, such additional parts are identical in construction with those of the third preferred embodiment shown in FIG. 5 mentioned above. Therefore, the explanation thereof will be omitted.

Having thus described some preferred embodiments adopting a movement vector detecting method by representative points, it is to be noted that the present invention is applicable to any other movement vector detecting methods, e.g., a full search method for searching a full area of a picture plane and detecting a movement vector.

As described above, according to the present invention, the first movement vector is obtained with the first density of the search points during the signal inputting period, and the second movement vector is obtained with the second density of the search points during the vertical blanking period by searching a narrow area defined by the first movement vector, thereby obtaining the final movement vector with a high accuracy to correct the camera shake. Accordingly, the correction accuracy can be greatly improved without almost increasing a scale of the camera shake correcting circuit constructed as a one-chip circuit.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A camera shake correcting device comprising:
   a memory for storing a representative image data representing an arbitrary n-th field, where n represents a positive integer;
   a first movement vector detecting circuit for searching a corresponding image data corresponding to said representative image data with a first search point density in an (n+i)-th field, where i represents a positive integer, during a signal inputting period as a dynamic image data of said (n+i)-th field and for outputting a displacement of said corresponding image data with respect to said representative image data as a first movement vector;
   a field memory for storing said dynamic image data of said (n+i)-th field during said signal inputting period; and
   a second movement vector detecting circuit for searching said corresponding image data with a second search point density higher than said first search point density in the vicinity of an end of said first movement vector during a vertical blanking period just after said signal inputting period and for outputting a displacement of said corresponding image data with respect to said representative image data as a final movement vector;
   wherein said dynamic image data of said (n+i)-th field stored in said field memory is read by using a reading address shifted according to said final movement vector.

2. The camera shake correcting device as defined in claim 1, wherein said first and second movement vector detecting circuits are replaced by a single movement vector detecting circuit adapted to be controlled in a time sharing fashion such that said first movement vector is output during said signal inputting period and said final movement vector is output during said vertical blanking period.

3. The camera shake correcting device as defined in claim 1, wherein a plurality of said first movement vector to be output during said signal inputting period are provided.

4. The camera shake correcting device as defined in claim 2, wherein a plurality of said first movement vector to be output during said signal inputting period are provided.

5. The camera shake correcting device as defined in claim 1 further comprising a low pass filter for preliminarily smoothing both said representative image data and said corresponding image data for outputting said first movement vector.

6. The camera shake correcting device as defined in claim 2 further comprising a low pass filter for preliminarily smoothing both said representative image data and said corresponding image data for outputting said first movement vector.

7. The camera shake correcting device as defined in claim 3 further comprising a low pass filter for preliminarily smoothing both said representative image data and said corresponding image data for outputting said first movement vector.

8. The camera shake correcting device as defined in claim 4 further comprising a low pass filter for preliminarily smoothing both said representative image data and said corresponding image data for outputting said first movement vector.

* * * * *